US005181046A

United States Patent [19]

Saita et al.

[11] Patent Number: 5,181,046

[45] Date of Patent: Jan. 19, 1993

[54] THERMAL HEAD

[75] Inventors: Yoshiaki Saita; Seiji Kuwahara; Yoshinori Sato, all of Tokyo, Japan

[73] Assignee: Seiko Instruments Inc., Japan

[21] Appl. No.: 639,665

[22] Filed: Jan. 9, 1991

[30] Foreign Application Priority Data

Jan. 9, 1990 [JP] Japan .................................... 2-1931

[51] Int. Cl.[5] ........................ B41J 2/345; H04N 1/024

[52] U.S. Cl. ............................................... 346/76 PH

[58] Field of Search .................... 346/76 PH; 219/543

[56] References Cited

U.S. PATENT DOCUMENTS 4,841,120 6/1989 Yagino et al. ....................... 219/216
4,982,201 1/1991 Seigenji ......................... 346/76 PH

FOREIGN PATENT DOCUMENTS 0110273 6/1983 Japan .
0110474 6/1985 Japan .
0239256 11/1985 Japan .
0141572 6/1986 Japan .
0021559 1/1987 Japan .
0212559 9/1988 Japan .
1266750 10/1986 U.S.S.R. .

*Primary Examiner*—Benjamin R. Fuller
*Assistant Examiner*—Huan Tran
*Attorney, Agent, or Firm*—Bruce L. Adams; Van C. Wilks

[57] ABSTRACT

The thermal head is comprised of several blocks each containing a plurality of heating elements. Each heating element has a pair of first and second lead electrodes which extend in the same direction from the heating element. The first lead electrodes are connected through corresponding switching elements to a first common electrode within each block. The second lead electrodes are directly connected to a second common electrode disposed adjacently to the first common electrode. The first and second common electrodes have a substantially identical tapered shape, and they are tapered in opposite directions to each other. The second lead electrodes are arranged to connect to one side of the tapered shape of the second common electrode.

20 Claims, 2 Drawing Sheets

THERMAL HEAD

BACKGROUND OF THE INVENTION

The present invention relates to a thermal head having a plurality of heating elements, each being connected to a pair of lead electrodes which extend in the same direction relative to the heating element and which are connected to common electrodes.

FIG. 4 shows the conventional thermal head in which a first common electrode 23 is connected to one end of each heating element 21, and an individual lead electrode 22 is connected to the opposite end of each heating element 21. A plurality of the heating elements 21 constitute one block. Each of the individual lead electrodes 22 is connected through a corresponding switching element 25 to a second common electrode 24. Generally, the second common electrode 24 is separately provided for each block. Otherwise, a single second common electrode may be provided for a plurality of the blocks. Further, generally a multiple of the switching elements included in one block are integrated in one IC chip which is disposed on the second common electrode. The first common electrode 23 has a pair of terminals 26 disposed on opposite sides of a thermal head substrate. The second common electrode 24 has also a terminal 27 disposed on an edge area of the substrate.

However, each heating element 21 has a different resistance of the current path, dependently on its position, from the terminal 26 to the terminal 27 through the first common electrode 23, the respective lead electrode 22 and the second common electrode 24. For example, one heating element positioned centrally relative to the first common electrode 23 has a higher resistance of the current path than that of another heating element disposed farmost outside. Particularly, when concurrently driving multiple ones of the heating elements, a great amount of driving current flows through the first common electrode so that the voltage applied to the heating elements varies significantly between a central element and an end element due to the difference in their current path resistance, thereby causing variation in their thermal outputs. This thermal output variation may be increased when a great number of heating elements are driven concurrently. Therefore, the conventional thermal head would exhibit a significant variation in the dot impression density. To avoid such variation, complicated control of the electric energy is needed in the conventional thermal head, thereby increasing the production cost thereof.

SUMMARY OF THE INVENTION

An object of the present invention is to, therefore, provide an improved arrangement of the common and lead electrodes effective to reduce current path resistance variation.

According to the present invention, the thermal head is comprised of several blocks each containing a plurality of heating elements. Each heating element has a pair of first and second lead electrodes which extend in the same direction from the heating element. The first lead electrodes are connected through corresponding switching elements to a first common electrode within one block. The second lead electrodes are directly connected to a second common electrode disposed adjacently to the first common electrode. The first and second common electrodes have a substantially identical tapered shape, and they are tapered in opposite directions to each other. The second lead electrodes are arranged to connect to one side of the tapered shape of the second common electrode.

As described above, the first and second common electrodes are generally arranged symmetrically to each other. Therefore, every heating element has a substantially identical resistance of current path between a positive terminal and a negative therminal through the common electrodes. Further, the common electrode has a varying pattern width gradually increasing toward a corresponding end terminal such that the common electrode has a varying sectional area substantially proportional to the widthwise current density so as to equalize electric power consumed in the heating elements and dissipated in the current path. Namely, the common and lead electrodes are optimumly patterned within the limited area of the thermal head substrate so as to equalize thermal energy generated in the respective heating elements to thereby improve the quality of the printed image.

DETAILED DESCRIPTION OF EMBODIMENTS

Figure 1:
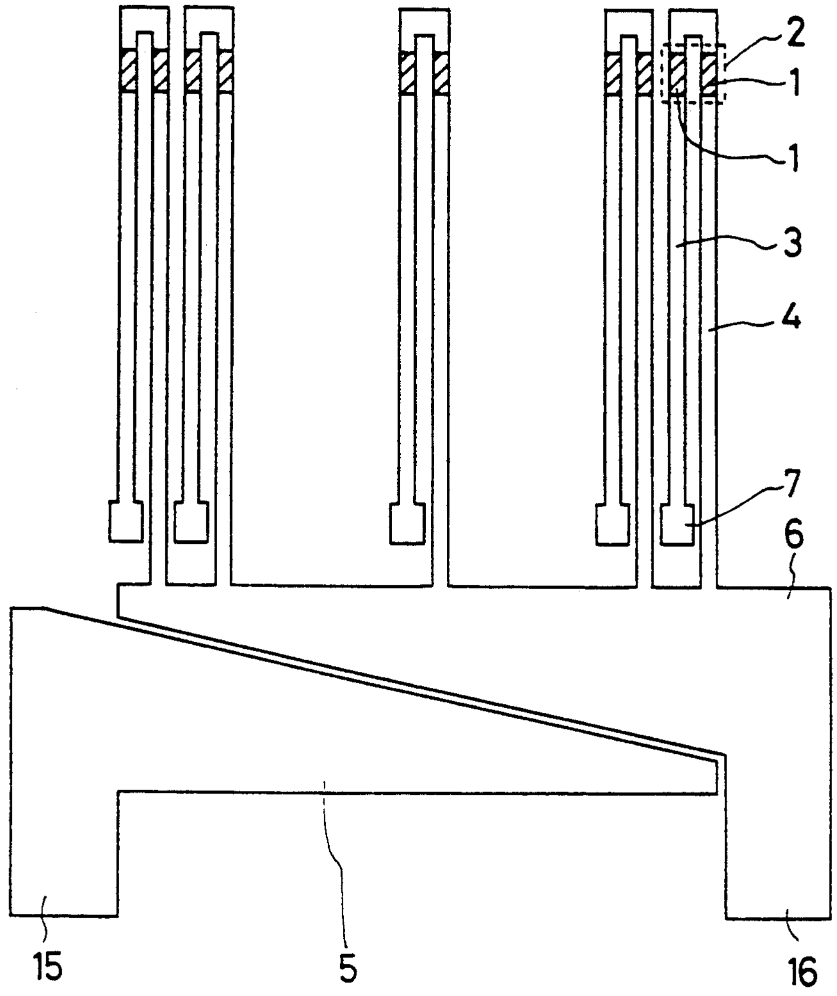
FIG. 1 is a plan view showing one block of the inventive thermal head.

Hereinafter, preferred embodiments of the invention will be described in detail with reference to the drawings. Referring to FIG. 1, each heating element 2 is comprised of a pair of resistors 1. A first lead electrode 3 is connected to one of the resistors 1, and a second lead electrode 4 is connected to the other of the resistors 1.

The pair of first and second lead electrodes are arranged to extend in the same direction in parallel to each other from the heating element 2. The second lead electrodes 4 are directly connected to a second common electrode 6 which is provided for each block of the thermal head.

Figure 2:
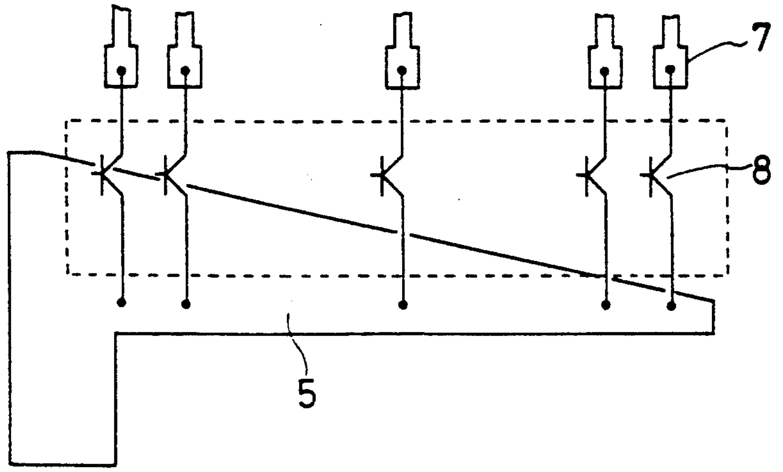
FIG. 2 is a partial plan view showing the connection around a first common electrode within the one block.

Referring to FIG. 2, each first lead electrode 3 is connected at its open end 7 to a corresponding switching element 8 which is connected to a first common electrode 5. Generally, the switching elements 8 are integrated into one driving IC chip which may be disposed on a substrate within one block. Namely, one block includes a given number of the heating elements and the driving IC chip contains a corresponding number of the switching elements.

Referring back to FIG. 1, the first common electrode 5 and the second common electrode 6 are patterned in a lengthwise tapered shape, and they are tapered in opposite directions. The first common electrode 5 has a terminal 15 for external connection and the second common electrode 6 has another terminal 16 for external connection, so as to provide electric power to the heating elements.

As shown in FIG. 1, the second lead electrodes 4 are connected to an upper side of the tapered second common electrode 6. When driving the heating elements within one block, driving current supplied from the terminal 16 is distributed to the respective heating elements so that the driving current reduces in the direction away from the terminal 16. In view of this, the second common electrode 6 has a tapered shape whose width changes gradually in the direction in which the driving current reduces, and the terminal 16 is provided at the widest end thereof. By such arrangement, the widthwise or transverse resistance of the second common electrode 6 gradually reduces toward the terminal 16. Therefore, even when concurrently driving all of the heating elements within the same block, drop of the driving voltage can be effectively avoided along the length of the second common electrode 6 because the widthwise resistance thereof is set proportionally to the widthwise driving current density.

Further, the first and second common electrodes are disposed oppositely to each other. Therefore, an extreme or closest heating element 2 has a second lead electrode 4 connected to the second common electrode 6 closely to its terminal 16 which is an inlet of the electric power and has a first lead electrode 3 connected to a tapered end portion of the first common electrode, 5 which is far from the outlet terminal 15 thereof. On the other hand, the other extreme or farthest heating element 2 has a second lead electrode connected to the second common electrode 6 far away from the inlet terminal 6 and has a first lead electrode 3 connected to the first common electrode 5 closely to its outlet terminal 15. Therefore, both of the extreme heating elements 2 have a substantially identical total current path lengthwise of the common electrodes 5,6. Stated otherwise, the total voltage drop through the first and second common electrodes does not vary throughout the different heating elements in the same block. Therefore, every heating element can generate uniform thermal energy to thereby achieve uniform dot impression density characteristics.

It would be effective to utilize a large and thick common electrode so as to reduce the resistivity in order to reduce voltage drop in the common electrode. However, such arrangement would enlarge a substrate area of the thermal head to increase production cost. In contrast, by patterning the common electrodes according to the invention, widthwise voltage drop can be minimized in the second common electrode, and lengthwise total voltage drop in the first and second common electrodes can be leveled or equalized within a limited area of each block.

Figure 3:
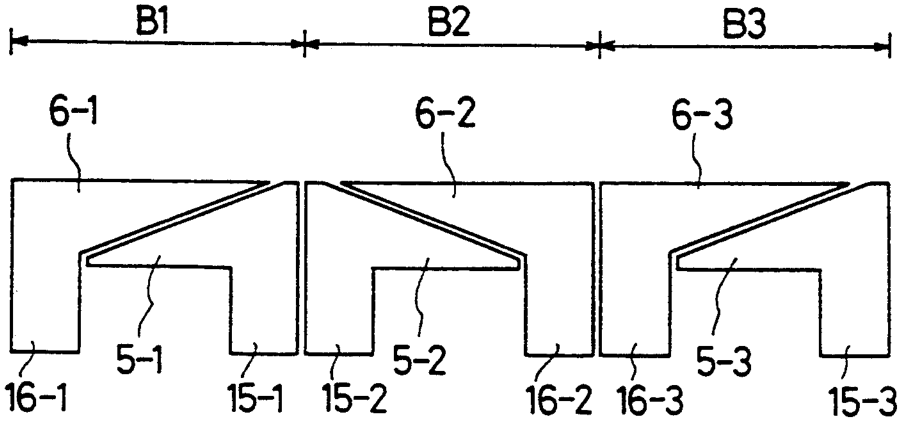
FIG. 3 is a plan view showing the overall arrangement of the inventive thermal head.
Figure 4:
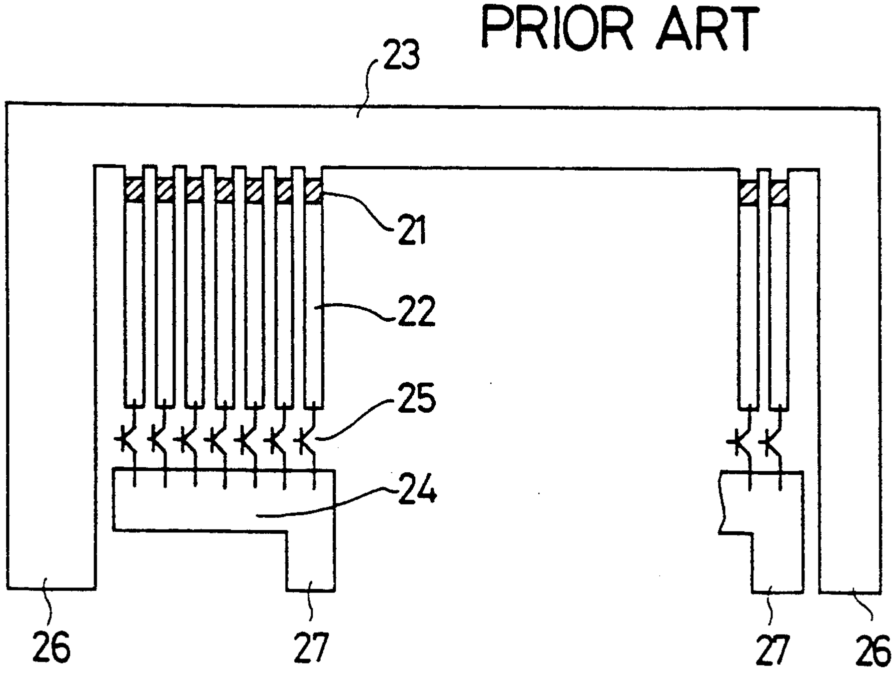
FIG. 4 PRIOR ART
FIG. 4 is a plan view of the conventional thermal head.

Referring to FIG. 3, the thermal head is comprised of three blocks B1, B2 and B3 having a particular layout of first and second common electrodes. The first block B1 is provided with a pair of first common electrode 5-1 and second common electrode 6-1, the second block B2 is provided with a pair of first common electrode 5-2 and second common electrode 6-2, and the third block B3 is provided with a pair of first common electrode 5-3 and second common electrode 6-3. Adjacent blocks have a symmetric layout of the first and second common electrodes. By alternately exchanging the positions of the first and second common electrodes, inlet terminals 15-1 and 15-2 are disposed adjacently to each other between the different blocks B1 and B2, and outlet terminals 16-2 and 16-3 are disposed adjacently to each other between the different blocks B2 and B3. These adjacent terminals need not be electrically isolated from each other because they are connected to a common power supply line. Moreover, the adjacent inlet terminals 5-1 and 5-2 or adjacent outlet terminals 6-2 and 6-3 can be formed of a united pattern.

In the FIG. 3 thermal head of elongated line type having multiple blocks, each block is individually connected through its pair of common electrodes to the power supply line at different points. Therefore, overall distribution of the driving voltage is also leveled throughout the line thermal head. Consquently, the respective heating elements can generate uniform thermal energy within the same block and between different blocks.

The second common electrode is not necessarily patterned in a tapered shape, but may be shaped such that the electrode has a varying pattern width gradually changing in proportion to the widthwise current density in the driving operation. For example, the common electrode may be patterned in a step shape.

The first and second common electrodes are not necessarily patterned in the tapered shape. They may be suitably shaped and arranged oppositely to each other to equalize total current path through individual heating elements from the first common electrode to the second common electrode.

As described above, the common electrode has a varying pattern width gradually changing proportionally to the distribution of the widthwise current density, thereby minimizing the voltage drop in the common electrode within a limited spacing. Further, the first and second common electrodes are arranged oppositely or reversely to each other to equalize the resistivity of the total current path length through the respective heating elements from the length of the first common electrode to the length of the second common electrode to equalize and minimize voltage drop in the different current paths, thereby improving printing quality and energy conversion efficiency of the small sized and moderately price thermal head.

What is claimed is:

1. A thermal head comprising: a plurality of heating elements grouped into blocks, each heating element having a pair of first and second lead electrodes arranged to extend in a same direction from the heating element; a plurality of switching elements connected to corresponding first lead electrode; a first common electrode disposed within each block to connect to the first lead electrodes through the switching elements; and a second common electrode disposed adjacently to the first common electrode within a same block to connect to the second lead electrodes, wherein the first and second common electrode are patterned in a generally similar shape having gradually varying width and are arranged lengthwise reversely to each other, and wherein the second lead electrodes are connected to a widthwise side of the second common electrode.

2. A thermal head according to claim 1; wherein the first and second common electrode have a tapered shape.

3. A thermal head according to claim 2; comprising a plurality of blocks each having a pair of first and second common electrodes arranged such that the tapered shape of the first and second common electrodes is oppositely patterned between adjacent blocks.

4. A thermal head comprising: a plurality of heating elements grouped into blocks, each heating element having a pair of first and second lead electrodes arranged to extend in a same direction from the heating element; a plurality of switching elements connected to corresponding first lead electrodes; a first common electrode disposed within each block to connect to the first lead electrodes through the switching elements; and a second common electrode disposed adjacently to the first common electrode within a same block to connect to the second lead electrodes, wherein the first and second common electrode lie in a common plane and extend parallel to one another and have a similar shape, and wherein the second lead electrodes are connected to a widthwise side of the second common electrode.

5. A thermal head according to claim 4; wherein the first and second common electrode have a tapered shape.

6. A thermal head according to claim 5; comprising a plurality of blocks each having a pair of first and second common electrodes arranged such that the tapered shape of the first and second common electrodes is oppositely patterned between adjacent blocks.

7. A thermal head comprising: a plurality of electric heating elements grouped into blocks; means for selectively flowing current through the heating elements; a first common electrode extending lengthwise in a given direction and connected to one end of each of the heating elements in the block; and a second common electrode extending lengthwise in the given direction and connected to another end of each of the heating elements in the block; wherein each heating element connected with the second common electrode is coupled with the first common electrode through the means for selectively flowing current, and wherein a sum of resistivities of the first common electrode and the second common electrode to each heating element is equivalent so that a total resistivity to current flowing through each heating element is equivalent.

8. A thermal head according to claim 7; wherein the means for selectively flowing current includes a plurality of switching elements connected between a respective heating elements and one of the first and second common electrode.

9. A thermal head according to claim 7; wherein the first and second common electrode have a length dimension in the given direction and a width dimension in a direction traverse to the given direction, the width dimension of at least one of the first and second common electrode varying along the given direction.

10. A thermal head according to claim 9; wherein the first and second common electrode have a generally similar shape.

11. A thermal head according to claim 10; wherein the first and second common electrode are arranged lengthwise reversely to each other.

12. A thermal head according to claim 11; wherein the first and second common electrode have a lengthwise tapered shape.

13. A thermal head according to claim 11; wherein ends of the heating elements are connected to the first and second common electrode at spaced intervals along lengths thereof.

14. A thermal head according to claim 13; including a plurality of first lead electrodes connecting the one end of respective heating elements to the first common electrode, and a plurality of second lead electrodes connecting the other end of respective heating elements to the second common electrode.

15. A thermal head according to claim 14; wherein the first and second lead electrodes in each block are all parallel to one another.

16. A thermal head according to claim 14; wherein the means for selectively flowing current includes a plurality of switching elements connected between respective first lead electrodes and the first common electrode.

17. A thermal head according to claim 16; wherein the first and second lead electrodes in each block are all parallel to one another.

18. A thermal head according to claim 16; wherein the first and second common electrodes have a lengthwise tapered shape.

19. A thermal head according to claim 7; wherein the first common electrode in two adjacent blocks are adjacent each other.

20. A thermal head according to claim 7; wherein the second common electrode in two adjacent blocks are adjacent each other.

* * * * *